(12) United States Patent
Rytter et al.

(10) Patent No.: US 8,324,128 B2
(45) Date of Patent: Dec. 4, 2012

(54) FISCHER-TROPSCH CATALYSTS

(75) Inventors: Erling Rytter, Trondheim (NO); Sigrid Eri, Ranheim (NO); Dag Schanke, Trondheim (NO)

(73) Assignees: Statoil ASA, Stavanger (NO); Petroleum Oil & Gas Corporation of South Africa (PTY) Limited, Waterfront (ZA)

( * ) Notice: Subject to any disclaimer, the term of this patent is extended or adjusted under 35 U.S.C. 154(b) by 849 days.

(21) Appl. No.: 10/535,066

(22) PCT Filed: Nov. 10, 2003

(86) PCT No.: PCT/GB03/04873
§ 371 (c)(1),
(2), (4) Date: Mar. 15, 2006

(87) PCT Pub. No.: WO2004/043596
PCT Pub. Date: May 27, 2004

(65) Prior Publication Data
US 2008/0064770 A1    Mar. 13, 2008

(30) Foreign Application Priority Data
Nov. 13, 2002  (GB) .................................. 0226514.8

(51) Int. Cl.
*B01J 23/75* (2006.01)
(52) U.S. Cl. ........................ 502/332; 502/325
(58) Field of Classification Search .................. 502/325, 502/332; 518/715, 728
See application file for complete search history.

(56) References Cited

U.S. PATENT DOCUMENTS

| | | | | |
|---|---|---|---|---|
| 3,933,883 | A * | 1/1976 | Parthasarathy | 518/715 |
| 3,988,263 | A * | 10/1976 | Hansford | 502/337 |
| 4,102,822 | A * | 7/1978 | Mulaskey | 502/322 |
| 4,613,624 | A | 9/1986 | Beuther et al. | |
| 4,888,316 | A * | 12/1989 | Gardner et al. | 502/20 |
| 5,639,798 | A | 6/1997 | Wilson et al. | |
| 6,075,062 | A | 6/2000 | Zennaro et al. | |
| 6,235,798 | B1 | 5/2001 | Roy et al. | |
| 6,255,358 | B1 * | 7/2001 | Singleton et al. | 518/715 |

(Continued)

FOREIGN PATENT DOCUMENTS
EP    0 736 326 A1    10/1996

(Continued)

OTHER PUBLICATIONS

ASTM Standard D4058-96, 2001, "Standard Test Method for Attrition and Abrasion of Catalysts and Catalyst Carriers," ASTM Int'l, West Conshohocken, PA. Viewed on Feb. 19, 2009 at http://www.astm.org/DATABASE.CART/HISTORICAL/D4058-96R01.htm.*

(Continued)

*Primary Examiner* — Daniel C McCracken
*Assistant Examiner* — Daniel Berns
(74) *Attorney, Agent, or Firm* — Patterson Thuente Christensen Pedersen, P.A.

(57) ABSTRACT

A catalyst for use in a Fischer-Tropsch synthesis reaction which comprises cobalt supported on alumina, in which: the catalyst average particle size is in the range 20 to 100 μm; the specific surface area of the impregnated and calcined catalyst particles is greater than 80 m$^2$/g; the average pore size of the impregnated and calcined catalyst is at least 90 Å (9 nm); and the pore volume of the impregnated and calcined catalyst is greater than 0.35 cm$^3$/g.

14 Claims, 2 Drawing Sheets

U.S. PATENT DOCUMENTS

| | | | |
|---|---|---|---|
| 7,351,393 B1 * | 4/2008 | Bayense et al. | 423/625 |
| 2006/0167119 A1 * | 7/2006 | Leng et al. | 518/726 |

FOREIGN PATENT DOCUMENTS

| | | |
|---|---|---|
| EP | 0 736 326 B1 | 8/2001 |
| EP | 1 129 776 A1 | 9/2001 |
| WO | WO 00/20116 A1 | 4/2000 |
| WO | WO 00/25918 * | 5/2000 |
| WO | WO 01/62381 A1 | 8/2001 |
| WO | WO 02/089978 A1 | 11/2002 |

OTHER PUBLICATIONS

Saib et al., "Silicon supported colbalt Fischer-Tropsch catalysts: effect of pore diameter of support," Catalysis Today, vol. 71, 2002, pp. 395-402.

Iglesia et al., "Selectivity Control and Catalyst Design in the Fischer-Tropsch Synthesis: Sites, Pellets, and Reactors," Advances in Catalysis, vol. 39, pp. 221-302, 1993.

Iglesia et al., "Reactions-Transport Selectivity Models and the Design of Fischer-Tropsch Catalysts," Computer-Aided Design of Catalysts, Edited by Becker and Pereira, Chapter 7, pp. 199-257, 1993.

* cited by examiner

FISCHER-TROPSCH CATALYSTS

RELATED APPLICATION

This application claims priority to PCT Application No. PCT/GB2003/004873 filed Nov. 10, 2003, and Great Britain Patent Application No. 0226514.8 filed Nov. 13, 2002.

TECHNICAL FIELD

The present invention relates to catalysts and their use in Fischer-Tropsch synthesis reactions, and also to a process for the production of the catalyst and a support for use in the production process.

BACKGROUND OF THE INVENTION

Conversion of natural gas to liquid hydrocarbons ("Gas To Liquids" or "GTL" process) is based on a 3 step procedure consisting of: 1) synthesis gas production; 2) synthesis gas conversion by FT synthesis; and 3) upgrading of FT products (wax and naphtha/distillates) to final products such as naphtha, kerosene, diesel or other products, for example lube oil base.

Supported cobalt catalysts are the preferred catalysts for the FT synthesis. The most important properties of a cobalt FT catalyst are the activity, the selectivity usually to C5 and heavier products and the resistance towards deactivation. Known catalysts are typically based on titania, silica or alumina supports and various metals and metal oxides have been shown to be useful as promoters.

In a paper by Iglesia et al. ["Selectivity Control and Catalyst Design in the Fischer-Tropsch Synthesis: Sites, Pellets and Reactors" Advances in Catalysis, 39(1993) 221, a Thieles modulus is defined as a product of two components, $\Psi_n$ and $\chi$, where $\Psi_n$ depends only on the diffusivity and reactivity of the individual molecules, whereas $\chi$ depends only on the physical properties and site density of the catalyst. They have described a model whereby the selectivity to $C_{5+}$ products can be described as a volcano plot in terms of $\chi$. The structural parameter is given as:

$$\chi = R_o^2 \Phi \theta_m / r_p,$$

where $\theta_m$ the site density, e.g. as the number of surface atoms of Co metal atoms per cm² of pore area in the catalyst particle, $R_o$ is the diffusion length, i.e. the radius of an essentially spherical catalyst particle, $\Phi$ is the porosity of the particle (cm³ pore volume/cm³ particle volume) and $r_p$ is the mean pore radius.

Now, the site density in the above equation can be rewritten as:

$$\theta_m = (W_{Co} D N_A \rho_{cat} r_p)/(Mw_{Co} 2\Phi)$$

where $W_{Co}$, D and $Mw_{Co}$ are the weight fraction of Co in the catalyst particle, the dispersion of Co (the number of exposed metal surface atoms to the total number of Co atoms in the particle) and the molecular weight, respectively. $N_A$ is Avogadro's number and $\rho_{cat}$ the catalyst density (g/cm3). Inserting the latter expression for the site density yields:

$$\chi = (R_o^2 W_{Co} D N_A \rho_{cat})/(2Mw_{Co}).$$

It is then obvious that $\chi$ only depends on a universal constant, characteristic data for cobalt in the catalyst as well as the size and density of the catalyst particles. It is particularly significant that $\chi$ does not depend on the pore radius, $r_p$. Now, surprisingly it has been found that the selectivity of the Fischer-Tropsch reaction to $C_{5+}$ products indeed do depend on the pore size.

In a paper by Saib et al. ["Silica supported cobalt Fischer-Tropsch catalysts: effect of pore diameter of support" Catalyses Today 71(2002) 395-402], the influence of the effect of the average pore diameter of a silica support on the properties of a cobalt catalyst and their performance in F-T synthesis is discussed. The article concludes that the support pore diameter has a strong effect on cobalt crystallite size with larger crystallites forming in larger pore sizes. Also, the activity was found to be a function of the metal dispersion and the maximum $C_{5+}$ selectivity a function of the conversion.

In EP 1 129 776 A1 it is argued that internal diffusion phenomena in a catalyst particle depend on the chemical and morphological structure of the catalyst (pore dimensions, surface area, density of the active sites) and on the molecular dimensions of the species in question. This is a general teaching found in relevant textbooks, e.g. expressed in terms of the Thiele modulus, and it is significant that the pore dimension, i.e. the pore radius or diameter is one of the critical parameters. Further, it is taught that for the Fischer-Tropsch synthesis, interparticle diffusion will create low concentrations of CO towards the centre of the particle with a consequent progressive rise in the $H_2/CO$ ratio inside the catalyst and that this condition favours the formation of light hydrocarbons (lower α-value and C5+ fraction). On the other hand, it is stated that multiphase reactors of the slurry type generally use small catalyst particles (20-150 μm) which do not give internal diffusion problems, and more specifically that for catalysts based on differently supported cobalt used in the Fischer-Tropsch synthesis, it is possible to neglect internal diffusion limitations by operation with particles having diameter of less than 200 μm. Reference is made to Iglesia et al., *Computer-aided design of catalysts*, E D. Becker-Pereira, 1993, chap. 7. This patent claims the benefit of particles in the range 70-250 μm to simplify the liquid/solid separation step in the process, while not negatively influencing the effectiveness of the catalyst.

To summarise, in EP 1 129 776 A1 and references therein, it is taught that regardless of pore dimension, the selectivity of the catalyst will not be affected as long as the catalyst particle diameter is below 250 μm, or at least below 200 μm. Now, we have very surprisingly found that even for small particles with an average size between 50-80 μm, the selectivity does vary with the pore size, specifically, larger pores give higher C5+ selectivities.

In EP 0 736 326 B1, it is shown that the C5+ selectivity can increase over a certain range of increasing pore size for a cobalt on alumina type FT catalyst. However, no reference or details of the method of measuring pore size is given, and it is well known that reported values vary significantly with method, e.g. for different probe gases or whether adsorption or desorption isotherms are employed. The pore size was essentially increased by using high calcination temperatures, a procedure that may adversely affect the attrition resistance of the catalyst. Comparably moderate catalyst pore volumes were also used, thus giving more dense particles that may be less favourable in a slurry reactor environment. No effect on selectivity with varying pore volumes was reported. Unfortunately, the reported particle sizes used in the tests are inconsistent and can therefore not be considered, more so as the low selectivity (and smallest pore size) data seem to be based on extruded catalyst samples. It is well known that large particles, typical of extrudates or coarse fractions thereof, will give low $C_{5+}$ (or liquid) selectivities due to diffusion limitations giving an efficient enhanced $H_2/CO$ ratio inside the particles. This results in some very low liquid selectivities reported in EP 0 736 326 B1, in the range 40 to 65 wt %.

Above 65 wt % liquid, there is no reported influence of pore size or pore volume in EP 0 736 326 B1.

DETAILED DESCRIPTION OF THE INVENTION

Figure 1:
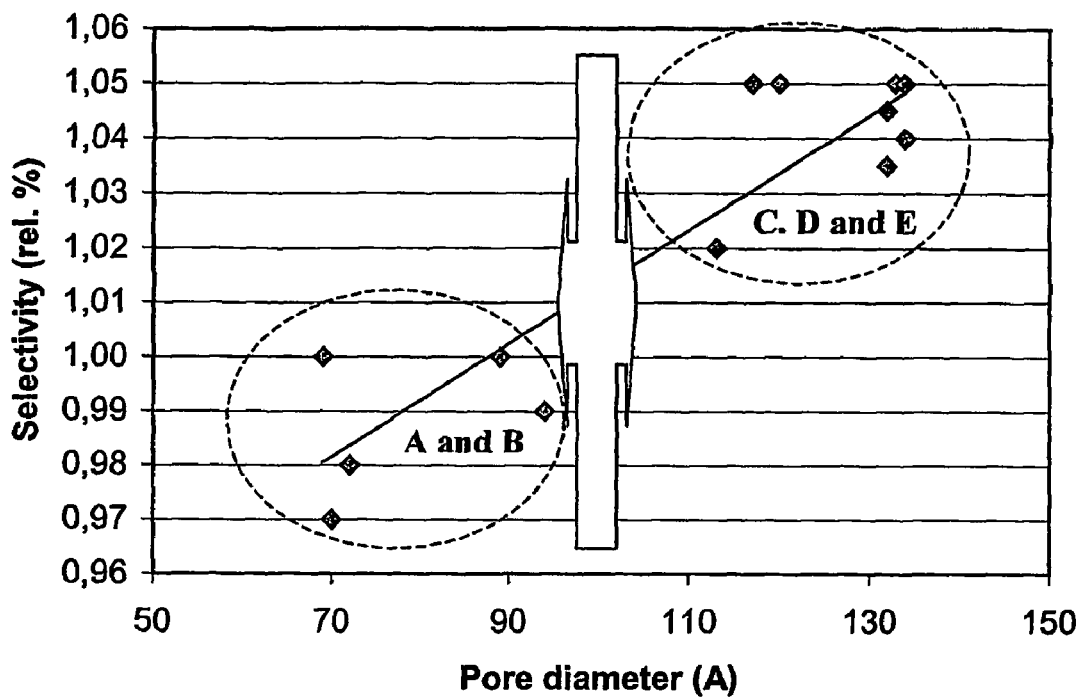
FIG. 1 illustrates the relationship between the selectivity and the mean pore diameter.

According to one aspect of the invention, there is provided a catalyst for use in a Fischer-Tropsch synthesis reaction which comprises cobalt supported on alumina, in which: the catalyst average particle size is in the range 20 to 100 µm; the specific surface area of the impregnated and calcined catalyst particles is greater than 80 m$^2$/g; the average pore size of the impregnated and calcined catalyst is at least 90 Å (9 nm); and the pore volume of the impregnated and calcined catalyst is greater than 0.35 cm$^3$/g.

Preferably the catalyst particle size is 100-250 µm, for example 30-100 µm.

Preferably, the specific surface area of the catalyst particles is in the range 120 to 220 m$^2$/g, and the average particle size range is 40 to 80 µm. Preferably, the average pore size of the catalyst is at least 110 Å (11 nm), more preferably at least 130 Å (13 nm). Preferably, the specific surface area of the impregnated and calcined is at least 120 m$^2$/g and the average pore size is at least 130 Å (13 nm). Preferably, the pore volume of the catalyst is at least 0.45 cm$^3$/g.

Preferably, the catalyst includes a promoter and generally the content might be less than 3% by weight. The promoter is preferably rhenium or platinum, or possibly iridium or ruthenium. The support material is preferably γ-alumina, optionally stabilised with a stabilising agent, for example, lanthanum. Preferably, the support includes a binder, which may represent <25 wt % of the catalyst. Preferably, the binder is an alumina-containing binder material.

Preferably, the specific surface area of the prepared catalyst, comprising the cobalt in an active catalytic form on the support, is in the range 125 to 160 m$^2$/g. Preferably, the cobalt content of the catalyst is from 10 to 40% by weight, more preferably 15 to 25 wt %.

According to another aspect of the invention, there is provided a process for the production of a catalyst as described above, which comprises: impregnating an alumina support with cobalt and optionally a promoter, optionally drying at less than 120° C., calcining the impregnated support at a temperature in the range 300 to 500° C. and treating the calcined catalyst with a reducing gas at an activation temperature in the range 250 to 500° C.; the alumina support prior to impregnation having a specific surface area in the range 80 to 225 m$^2$/g and a mean pore diameter in the range 110 to 400 Å (11 to 40 nm).

Preferably, the alumina support has a pore volume in the range 0.6 to 1.0 cm$^3$/g, prior to impregnation. Preferably, the peak calcination temperature is in the range 300 to 450° C., and the activation temperature is in the range 350 to 500° C., more preferably 300 to 450° C. Preferably, the calcination is carried out for between 0.5 and 6 hours, and the activation treatment is carried out for between 1 and 10 hours.

Preferably, the reducing gas is hydrogen and/or carbon monoxide, optionally mixed with an inert gas. Preferably, prior to impregnation, the support is pre-calcined at a temperature in the range of 400 to 900° C. Preferably, the alumina support is γ-alumina and the process includes the step of stabilising the γ-alumina prior to the calcination step. Preferably, prior to impregnation, the alumina support has a specific surface area in the range 150 to 240 m$^2$/g, and the alumina support has a pore volume in the range 0.7 to 0.9 cm$^2$/g.

Preferably, the impregnation step comprises an incipient wetness treatment in which an aqueous solution of a cobalt compound and optionally a rhenium compound is mixed with the dry support material until the pores are filled, and the impregnated support is then dried, prior to the calcining step. Preferably, the drying is carried out at 80 to 120° C.

Preferably, the cobalt compound is selected from cobalt nitrate (Co(NO$_3$)$_2$), cobalt acetate(s), cobalt halide(s), cobalt carbonyl(s), cobalt oxalate(s), cobalt phosphate(s), cobalt carbonate(s), cobalt (hexa)amine salt(s) and organic cobalt compounds. Preferably, the rhenium compound is selected from perrhenic acid (HReO$_4$), ammonium perrhenate, rhenium halide(s) and rhenium carbonyl(s). Most preferably, the cobalt compound is cobalt nitrate and the rhenium compound is perrhenic acid.

Preferably, prior to impregnation, the alumina support has an ASTM attrition value of less than 30% by weight of fines produced by 5 hours testing. Preferably, the ASTM value is <20%.

The invention also extends to the use of a catalyst as described above or as produced as described above in a Fischer-Tropsch synthesis reaction.

The invention also extends to a method for the production of hydrocarbons which comprise subjecting H$_2$ and CO gases to a Fischer-Tropsch synthesis reaction in the presence of a catalyst as described above. The F-T synthesis product may subsequently be subjected to post processing, which may comprise de-waxing, hydro-isomerisation, hydro-cracking, washing, finishing, fractionating, blending, cracking, reforming and combinations of these.

The described FT catalyst is suited for use in a three-phase reactor, particularly a slurry bubble column. However, an additional option is to form the catalyst into any suitable shape such as spheres, pellets or extrudates, with or without intrusions. Further, additives or binder materials may be added as needed as part of the forming process. Such formed materials will typically have a size in the range 1 to 20 mm and be used in a fixed-bed reactor or dense three-phase reactor like an ebbulating bed.

The FT reaction is operated with a syngas comprising hydrogen and CO, in addition to inert or essentially inert components such as CO$_2$, methane and/or nitrogen. Significant amounts of steam and light hydrocarbons will also be present, at least due to their synthesis in the process itself, in addition to some olefinic and oxygenated by-products. The temperature used with a CO-type catalyst intended for primary production of paraffinic wax is in the range between 190 and 250° C., more typically between 200 and 230° C. The total pressure can be in the range 10 to 50 bar, typically between 15 and 30 bar. The hydrogen to CO consumption ratio in the process is close to 2. Therefore the H$_2$/CO feed ratio will not vary much from this value. However, it might be advantageous to feed with a lower H$_2$/CO ratio, eg. between 1.5 and 1.95, thereby giving a higher selectivity to C$_5$+ products.

A slurry bubble column will contain several features within the reactor shell or attached as an external device. These features may comprise a gas distributor, heat exchanger tubes, a system for separating the liquid product from the slurry and possible downcomers for forced circulation to enhance the backmixing and level out gradients in the reactor. The superficial gas velocity based on the full diameter of the reactor is typically in the range 10 to 60 cm/s more typically 20-40 cm/s, thus operating in the churn turbulent flow regime.

The products will be condensed, if needed, and separated through a system of separation vessels and columns, and blended to desired products. A large portion of the product consisting of long chain hydrocarbons can be treated under hydrogen and elevated temperature and pressure with one or several catalysts to remove oxygenates and saturate olefins, crack the chain to the desired length and isomerize essentially straight paraffins to branched paraffins. Such a treatment typically gives a synthetic diesel or diesel blending component that contains no aromatics or sulphur compounds, in addition to having a very high cetane index (above 50 or even above 70) and a desired cloud point. Other products that might be produced ultimately include naphtha, particularly petrochemical naphtha, base oil for lubricant production and components for synthesis of detergents such as linear higher alfa-olefins, in addition to the by-products LPG, alfa-olefins and oxygenates.

The invention also extends to a catalyst support in which the catalyst average particle size is in the range 20 to 100 μm and the average pore size of the catalyst is at least 90 Å (9 nm).

Preferably, the support has a pore volume >0.6 cm$^3$/g, and a specific surface area >100 m$^2$g. Preferably, the support material is silica, titanium dioxide or alumina, most preferably alumina. Preferably, the support has an ASTM attrition value of <20.

The invention may be carried into practice in various ways and some embodiments will now be described by way of example.

Support Materials

A morphous catalyst support materials typically have surface areas between 50 and 500 m$^2$/g, more typically between 100 and 300 m$^2$/g. The alumina supports ALU-A to ALU-D applied in embodiments of the present invention are at least predominately, of the γ-alumina type with surface areas between 100 and 200 m$^2$/g. These supports are prepared by spray-drying techniques using appropriate solutions in order to obtain essentially spherical particles of appropriate size, e.g. 80% in the range between 30-120 μm. After spray-drying, the material is calcined at a high temperature to give the appropriate crystal size and pore structure. These calcinations can be performed at temperatures above 800° C.

Further, it is essential that the pore volume is sufficiently high, above 0.4 cm$^3$/g or better, above 0.6 cm$^3$/g. This will give a light material suitable for operation in a slurry environment and ease the impregnation by minimising the number of impregnation steps required. At the same time the support, and the final catalyst, should have sufficient strength for extended operation of months or years with minimal attrition of the materials. This can be tested in a slurry environment or by the ASTM method applicable for testing FCC (fluid catalytic cracking) catalysts.

The various support materials are as follows, and further information is set out in Table 4.

ALU-A

This standard γ-alumina is available under the trade name PURALOX from Condea of Germany (recently changed to Sasol GmbH) with the code SCCa-40/195.

ALU-A*

This is the same as ALU-A, but without the additional drying and precalcination step at 500° C. usually applied before impregnation, see below. From Table 4 it is seen that the properties of ALU-A and ALU-A* are indistinguishable, as expected. This is also a verification of the reproducibility of the analytical methods used.

ALU-B

This is a developmental spray-dried and calcined alumina provided by a second supplier.

ALU-C

A specially design alumina support for the purpose of the present invention of the same PURALOX SCCa series as for ALU-A.

ALU-D

A second specially design alumina support for the purpose of the present invention of the PURALOX SCCa series of materials.

ALU-E

A third specially design PURALOX SCCa type alumina support for the purpose of the present invention.

ALU-X

A specially designed alumina support (CPR 11 type) provided by a third supplier, Akzo Nobel.

ALU-Y

A specially designed alumina support provided by a fourth supplier, Alcoa, containing a few percent lanthanum and intended as a washcoat material for exhaust catalysts.

ALU-Z

A catalyst support of the type Catapal B.

FCC

A particularly hard alumina with an attrition resistance suitable for use in an FCC (Fluid catalytic cracking) refinery process.

From Table 4 it is clear that the surface areas are in a conventional and fairly narrow range for all the supports. For example, ALU-A and ALU-C have practically the same surface area. ALU-C and ALU-D are special in that they have a particularly high pore volume. Most noticeable is the gradual increase in mean pore diameter from ALU-A to ALU-D.

Upon high temperature treatment, the γ-aluminas of the different alumina hydrates will be converted to transition phase aluminas, denoted δ, θ, η, χ or κ-aluminas, that will all finally will be converted to α-alumina, with gradual decrease in surface areas. These aluminas may also be suitable as support materials for cobalt for the Fischer-Tropsch synthesis, even for surface areas in the range 10-50 m$^2$/g, although a surface area higher than this number is advisable in order to obtain sufficiently high cobalt metal loading and dispersion. It is also possible to increase the high temperature stability of aluminas by adding certain stabilising agents like lanthanum (lanthanum oxide). Thus, the γ-phase can be retained, even above 1000° C. Other stabilising agents have also been reported, such as magnesia or ceria. Different support materials are also frequently used as support materials for active metals or metal salts in catalytic reactions. Some materials reported for use in the Fischer-Tropsch synthesis are silica and titania (anatase or rutile). Other options include silica-aluminas, zirconia and zeolites.

Three other properties that are important for the support, and for the final catalyst, in particular when used in a slurry reactor environment like a slurry bubble column, are the particle density, the particle size, and the abrasion or attrition resistance. The density is important to be able to secure a suitable distribution (dispersion) of the catalyst particles in the reactor; a light material is particularly advantageous for avoiding settling or an excessive concentration of particles in the lower part of the reactor. The particle size is also related to settling and the catalyst concentration profile, but should not be excessively small, to facilitate separation of the liquid product from the reactor slurry and prevent particles being transported with the gas phase at the top of the reactor. Attrition should be minimised to prolong the lifetime of the catalyst and avoid contamination of the liquid hydrocarbon product. Examples of these parameters for selected γ-alumina supports are shown in Table 0. There is a tendency for a light support and catalyst to be weak material. Further, impregnation and calcinations reduce the attrition resistance somewhat. The FCC catalyst is a very attrition resistant reference catalyst intended for use in the fluidized-bed riser of a Fluid Catalytic Cracking unit at an oil refinery, and therefore should be regarded as a limit for an, in this respect, particularly hard catalyst.

TABLE 0

Properties of γ-alumina supports and two selected catalysts.

| Support* (Catalyst) | Average particle size (μm) | BET surface area (m²/g) | Particle Density** (g/ml) | Attrition*** Fines collected (wt %) | | |
|---|---|---|---|---|---|---|
| | | | | 1 h | 3 h | 5 h |
| SUP-A | 59 | 194 | 1.32 | 2.8 | 6.1 | 8.8 |
| SUP-C | 80 | 191 | 0.99 | 2.1 | 6.6 | 11.5 |
| SUP-E | | 183 | 0.97 | 4.4 | 18.8 | 296 |
| SUP-X | 38 | 200 | 1.08 | 3.9 | 10.3 | 16.5 |
| SUP-Y | | 235 | 1.07 | 17.9 | 46.0 | 50 |
| CAT-E1 | | 146 | 1.31 | 6.5 | 23.9 | 35.7 |
| FCC | | 162 | 2.00 | 1.5 | 3.5 | 5.3 |

*See also data in Table 4.
**Based on pore volume measurements.
***Fines collected over top of an ASTM type fluid-bed apparatus designed for testing FCC catalysts, starting with 50 g material sieved to >40 μm.

Catalyst Preparation

Unless otherwise stated, the catalysts all contain a nominal amount of cobalt of 20 wt % and 1 wt % Re, as calculated assuming reduced catalysts with complete reduction of cobalt. The actual metal loading as determined by XRF or ICP may vary by up to 12%, i.e. for cobalt between 18 and 22 wt % of the total reduced catalyst weight.

Before impregnation, the catalyst support is precalcined at about 500° C. Impregnation is in a single or multiple steps from a mixed aqueous solution of appropriate metal salts, generally of cobalt nitrate and perrhenic acid. The impregnation technique is by the pore filling or "incipient wetness" method that implies that the solution is mixed with the dry support until the pores are filled. The definition of the end point of this method may vary somewhat from laboratory to laboratory, giving an impregnated catalyst that has a completely dry appearance to one which appears sticky or snow-like. In no instance is there any free flowing liquid present.

The impregnated catalyst is dried, typically at 80-120° C., to remove water from the catalyst pores, and then calcined at typically 300° C.

The above description represents a standard way of preparing the catalysts. However, there are a number of variations of these procedures that will not influence the essence of the invention. It has been found that if the catalyst support is already calcined, e.g. at a supplier's facility, to a higher temperature than 500° C., recalcinations at this temperature prior to impregnation have minimal effect (Table 4). Further, calcination after impregnation of the metal salts at different conditions are also appropriate, Table 1. It is obvious that large variations in the calcination conditions can be applied to achieve good activity and selectivity of the catalyst. However, it is known that calcinations for a prolonged time at a sufficiently high temperature will cause agglomeration of the cobalt crystallites and hence a reduced catalytic activity. Using low calcination temperatures and times will result in an incomplete decomposition of the cobalt nitrate, and a residual nitrogen content that might cause problems in the subsequent reduction step. The calcinations in the present case are performed in a stationary oven with a certain temperature ramping speed of 2° C./min. It should be understood that the ramping speed could be varied and that any standard or specially designed calcination equipment could be applied by adjusting the conditions properly. Examples of such calcination equipment are continuous or batch wise operated rotational calciners and conveyor belt type calciners. Additional data for the performance of the catalysts CAT-D3 and CAT-D4 are given in Table 4.

TABLE 1

Effect of calcination conditions after impregnation.*

| Catalyst | Calcination T (° C.) and duration (h) | | Residual nitrogen (wt % $NO_3$) | Relative activity | Rel. $C_{5+}$ selectivity |
|---|---|---|---|---|---|
| CAT-C1' | 300 | 1 | 0.08 | 0.99 | 1.04 |
| CAT-C1" | 300 | 16 | 0.02 | 0.88 | 1.04 |
| CAT-C1''' | 350 | 4 | 0.015 | 0.94 | 1.05 |
| CAT-C1'''' | 400 | 1 | 0.009 | 0.93 | 1.05 |
| CAT-C1''''' | 450 | 1 | 0.005 | 0.93 | 1.03 |
| CAT-D2' | 400 | 1 | 0.016 | 0.96 | 1.05 |

*See Table 4 and text for explanation of relative activity and selectivity, and catalyst notation.

Another important step in the catalyst preparation is the impregnation of the metal salts. A number of different procedures have been described in the literature, including the case of alternative solvents and chemicals. The preferred procedure involves aqueous incipient wetness with solutions of cobalt nitrate ($Co(NO_3)_2$) and perrhenic acid ($HReO_4$). Alternatives include using cobalt acetate(s), cobalt halide(s), cobalt carbonyl(s), cobalt oxalate(s), cobalt phosphate(s), organic cobalt compounds, ammonium perrhenate, rhenium halide(s), rhenium carbonyl(s), industrial metal salt solutions and organic solvents. However, the impregnation technique may encompass all available methods besides incipient wetness, such as precipitation, impregnation from slurry with surplus liquid, chemical vapour deposition etc. It is well known that the impregnation method may influence the dispersion of the active metal (cobalt) and hence the catalytic activity, but as the Fischer-Tropsch reaction is believed to be non-structure sensitive, the dispersion should not influence the selectivity. Table 2 compares catalysts prepared by the incipient wetness method, but using different amounts of water. The appearance of the catalysts prior to calcination will then vary from completely dry and free flowing to lumpy, like wet snow. Again, excellent and consistent performance in terms of activities and selectivities is achieved. The chemicals used were also varied, see Table 4, catalysts CAT-D5 and CAT-D6.

TABLE 2

Effect of impregnation method.*

| Catalyst | Amount liquid (ml/g) | Mean pore diameter (A) | Relative activity | Rel. $C_{5+}$ Selectivity |
|---|---|---|---|---|
| CAT-D1 | 1.5 | 133 (1.33 × 10−8 m) | 0.81 | 1.05 |
| CAT-D1' | 1.25 | | 0.96 | 1.06 |
| CAT-D1" | 1.0 | | 0.99 | 1.05 |

*See Table 4 and text for explanation of relative activity and selectivity, and catalyst notation.

Catalyst Materials

Note that the X in CAT-Xn denotes the support material applied.

CAT-A1

Catalyst prepared in our laboratory (L1) with standard procedures as described above and one-step impregnation.

CAT-A2

Catalyst prepared in the laboratory of a catalyst supplier (L2) with standard procedures as described using two-step impregnation with calcinations in between.

CAT-A3

Catalyst prepared in the laboratory of a catalyst supplier (L2) with standard procedures as described using three-step impregnation with drying in between.

CAT-B1

Catalyst prepared in our laboratory (L1) with standard procedures as described above and one step impregnation, but using 12 wt % Co and 0.5 wt % Re.

CAT-B2

As CAT-B1, but standard Cobalt and Rhenium loading.

CAT-B3

Catalyst prepared in the laboratory of a second catalyst supplier (L3) with standard procedures as described above using one-step impregnation.

CAT-C1

Catalyst prepared in our laboratory (L1) with standard procedures as described above and one-step impregnation.

CAT-C2

Reproduction of CAT-C1.

CAT-D1

Catalyst prepared in our laboratory (L1) with standard procedures as described above and one-step impregnation.

CAT-D2

Catalyst prepared in the laboratory of a catalyst supplier (L2) with standard procedures as described using one-step impregnation.

CAT-D3

Catalyst prepared in the laboratory of a catalyst supplier (L2) with standard procedures as described using two-step impregnation with drying in between.

CAT-D4

As CAT-D3, but the final calcinations is performed at 400° C.

CAT-D5

Catalyst prepared in the laboratory of a second catalyst supplier (L3) with standard procedures as described above using one-step impregnation.

CAT-D6

Catalyst prepared in the laboratory of a second catalyst supplier (L3) with standard procedures as described above using one-step impregnation, but from an industrial cobalt solution and ammonium perrhenate

CAT-E1

Catalyst prepared as D1, but on the E-support.

Additional materials tested include those using alternative promoters to rhenium, specifically, platinum, iridium or ruthenium, that all are beneficial. Another option to add a second promoter such as lanthanum oxide or a mixture of oxides of the lanthanides or other difficult reducible compounds, salts and oxides, as well as the alternative support materials mentioned above.

Catalyst Testing and Characterization

One critical step before testing is the activation of the catalyst, involving reduction of cobalt oxide(s) to cobalt metal. This reduction can be performed by flowing a suitable reducing gas over the catalyst particles. Particularly suitable are hydrogen or carbon monoxide or mixtures thereof. The reducing gas can be mixed with inerts such as nitrogen, noble gases or steam and suitable temperatures and pressures should be applied. If a fluidised bed reactor is used for activation, it might be convenient to use a recycle of (part of) the reductive gas and a slight atmospheric total overpressure just to secure a suitable gas flow. It is also possible to use elevated total pressures, for example up to 8 bar ($8 \times 10^5$ Pa) or higher, or even the Fischer-Tropsch reactor pressure. Selection of the reduction temperature strongly depends on the actual catalyst formulation, and in particular on the presence and nature of promoters. For one set of catalysts, the reducibilities shown in Table 3a were found to be determined by back oxidation with pure oxygen gas. It is verified that the Re promoter is highly efficient in achieving high reducibilities at a convenient temperature. Some exploratory performance data for activated catalysts are given in Table 3b. It can be seen that acceptable gas velocities (GHSV) can be applied for a moderate period of time. There is, however, a lower limit of $\frac{1}{10}$ of the highest GHSV is unsuccessful, unless the reduction period is sufficiently long.

TABLE 3a

Effect of reduction conditions in hydrogen at approx. atmospheric pressure.

| Catalyst: γ-alumina, | | Reduction conditions | | Reduction |
|---|---|---|---|---|
| Co (wt %) | Re (wt %) | T (° C.) | time (h) | efficiency (%) |
| 18 | 1 | 200 | 2 | 12 |
| 18 | 1 | 250 | 2 | 26 |
| 18 | 1 | 350 | 2 | 67 |
| 18 | 1 | 350 | 10 | 83 |
| 18 | 1 | 450 | 2 | 86 |
| 18 | 1 | 450 | 10 | 84 |
| 18 | 1 | 600 | 10 | 86 |
| 18 | — | 350 | 10 | 35 |
| 18 | — | 450 | 10 | 65 |

TABLE 3b

Effect of reduction conditions in hydrogen at approx. atmospheric pressure and 350° C.*

| Catalyst | Flow of hydrogen ($Ncm^3/g_{cat} * h$) | Reduction time (h) | Relative activity | Rel. $C_{5+}$ Selectivity |
|---|---|---|---|---|
| CAT-D1 | 15,000 | 16 | 0.82 | 1.05 |
| CAT-D1 | 5,000 | 16 | 0.94 | 1.06 |
| CAT-D1 | 5,000 | 4 | 0.94 | 1.05 |
| CAT-D1 | 1,500 | 16 | 0.84 | 1.05 |
| CAT-C1 | 15,000 | 2 | 0.89 | 1.01 |
| CAT-C1 | 1,500 | 2 | 0.74 | 1.03 |

*See Table 4 and text for explanation of relative activity and selectivity, and catalyst notation.

A particularly important method for characterisation of the present catalysts and support materials is related to the determination of the pore characteristics; pore volume, pore size distribution, surface area and average pore size. There are a number of variations of the techniques applied, but most are variations of the so-called BET method using the adsorption or desorption isotherms of a gas that is adsorbed to the surface of the pores, typically nitrogen, but also certain noble gases or mercury can be used for specialised purposes. In the present invention, the nitrogen desorption isotherm has been used, measured by standard procedures on an ASAP 2000 instrument from Micromeretics and the standard included software for calculation of the pore characteristics.

The values reported in the tables are the BET surface area, the BJH desorption cumulative pore volume between 17 and 3000 A (17 and 3000×10$^{-10}$ m) diameter and the BJH desorption average pore diameter (4V/A). Specific values will vary depending on the method, but the general findings of this invention are expected to be valid regardless of any standard method employed, and characterisation data compared therefore should be harmonized to a given method. This means, of course, that values cited depend on the method, and should be adjusted accordingly if another method and procedure is applied.

The particle size distribution was measured by laser light scattering of a water dispersion using a Malvern type instrument. It should be noted that somewhat different results will be obtained if a different dispersion medium is employed, e.g. an alcohol will give a slightly lower average particle size.

The modified ASTM type equipment for testing attrition consists of two main parts, one air feeding system and one reactor where the attrition takes place. Compressed air passes through a pressure regulator at 5 bar (5×10$^5$ Pa) to a moisture chamber where the air is moisturised to approximately 30% relative humidity. This is done to avoid static electricity in the system. The amount of air is then adjusted in a mass flow controller. The humid air is then entering the reactor (ID=1.4", L=28") through a sieve tray where the holes have a diameter of 0.4 mm. Because of these holes, the gas reaches sonic velocity, which causes the "wear and tear" on the particles in the reactor. The pressure is approximately 1.8 bar (1.8×10$^5$ Pa).

After passing through the reactor, the velocity is reduced in the separation chamber (ID=4.4" (117.8 mm), L=12" (304.8 mm). Conical connections: L=8" (203.2 mm) between reactor and separation chamber, L=4" (101.6 mm) between separation chamber and u-tube) above the reactor. Particles >40 μm will fall back down into the reactor, while smaller particles <40 μm (fines) will enter a Soxhlet-filter through a u-formed tubing. A vibrator is mounted on the separation chamber, to loosen any particles on the inside walls.

50 g of powder or catalyst, sieved to >40 μm before testing, is loaded to the reactor, and the reactor is connected to the separation chamber. The air is turned on, and the fines produced in the reactor and collected in the Soxhlet filter are weighed every 15 minutes during the first 2 hours, and every 30 minutes during the next 3 hours. A normal run lasts 5 hours and the amount of fines produced can be plotted against time.

The catalysts were tested in an isothermal fixed-bed microreactor. The reactor was 25 cm long and had an inner diameter of 1 cm. Each catalyst was given a pretreatment consisting of reduction by passing hydrogen over the catalyst while heating the catalyst at a rate of 1° C./min to 350° C. and maintaining this temperature for 16 h at a pressure of 1 bar. In the tests, synthesis gas consisting of 2.1:1 H$_2$:CO (+3 vol % N$_2$) was passed over 1-2 g of the catalyst diluted 1:5 with SiC at 20 bar at 210° C. and at the desired space velocity. The space velocity was varied to keep the CO conversion between 40 and 45% after stable operation was obtained, and the activity and selectivity was measured for the 90-100 h on stream time interval.

TABLE 4

Effect of support material.**

| Sample | Surface area (m$^2$/g) | Mean pore diameter (A) (×10$^{-10}$ m) | Pore volume (cm$^3$/g) | Average particle size (μm) | Relative activity | Relative C$_{5+}$ selectivity |
|---|---|---|---|---|---|---|
| Alumina supports: | | | | | | |
| ALU-A | 194 | 73 | 0.51 | 59 | — | — |
| ALU-A* | 193 | 73 | 0.51 | n.a. | — | — |
| ALU-B | 139 | 99 | 0.48 | 87 | — | — |
| ALU-C | 191 | 118 | 0.76 | 80 | — | — |
| ALU-D | 179 | 143 | 0.83 | 79 | — | — |
| ALU-E | 183 | 130 | 0.79 | | — | — |
| Catalysts: | | | | | | |
| CAT-A1 | 150 | 69 | 0.32 | n.a. | 1.00 | 1.00 |
| CAT-A2 | 139 | 72 | 0.30 | 63 | 0.86 | 0.98 |
| CAT-A3 | 150 | 70 | 0.31 | 63 | 0.80 | 0.97 |
| CAT-B1 | | | | n.a. | 0.59 | 1.00 |
| CAT-B2 | 120 | 89 | 0.30 | n.a. | 0.90 | 1.01 |
| CAT-B3 | 102 | 94 | 0.29 | n.a. | 0.77 | 0.99 |
| CAT-C1 | 139 | 113 | 0.48 | 60 | 0.97 | 1.03 |
| CAT-C2 | 132 | 117 | 0.45 | n.a. | 0.80 | 1.05 |
| CAT-D1 | 138 | 133 | 0.55 | n.a. | 0.81 | 1.05 |
| CAT-D1* | n.a. | n.a. | n.a. | n.a. | 0.96 | 1.04 |
| CAT-D2 | 140 | 134 | 0.55 | n.a. | 1.02 | 1.07 |
| CAT-D3 | 140 | 134 | 0.55 | n.a. | 0.90 | 1.05 |
| CAT-D4 | 136 | 132 | 0.54 | n.a. | 0.93 | 1.04 |
| CAT-D5 | 135 | 132 | 0.53 | n.a. | 0.82 | 1.05 |
| CAT-E1 | 146 | 120 | 0.52 | n.a. | 1.00 | 1.05 | n.a.: Data not available.
*Support not recalcined before impregnation.
**Relative activity = 1 corresponds to a rate of ca. 1.1 g$_{hydrocarbons}$/g$_{cat}$ * h.
Relative C$_{5+}$ selectivity = 1 corresponds to 78% in fixed bed after 90 h.

First, it can be seen that the surface areas, pore diameters and pore volumes are reduced upon impregnation/calcinations, but the trends of the supports are maintained concerning pore diameters and volumes. The surface areas of the catalysts are confined in a rather narrow range.

CAT-B1 naturally has a low relative activity due to the reduced cobalt content, whereas the activities of the other catalysts are 0.90±14% (excluding the catalyst with 12% cobalt and the catalyst made from a more impure cobalt solution). This range is normal in view of the different impregnation techniques used, the skills practiced at three separate laboratories, and the reproducibility of the test method.

Figure 2:
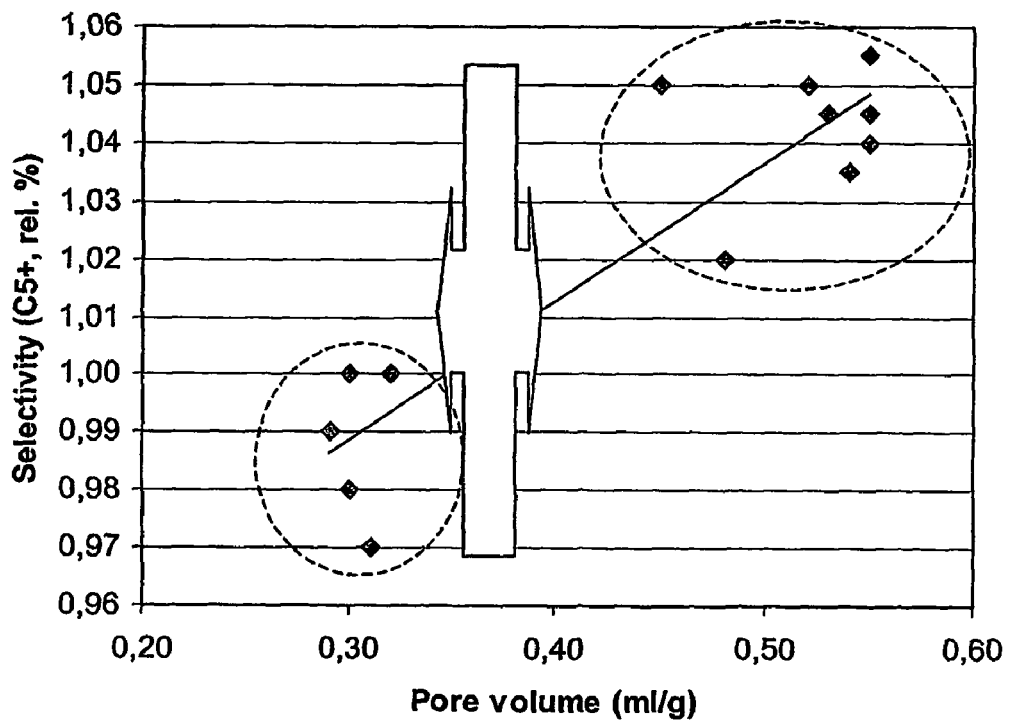
FIG. 2 illustrates the relationship between the selectivity and the pore volume.
Figure 3:
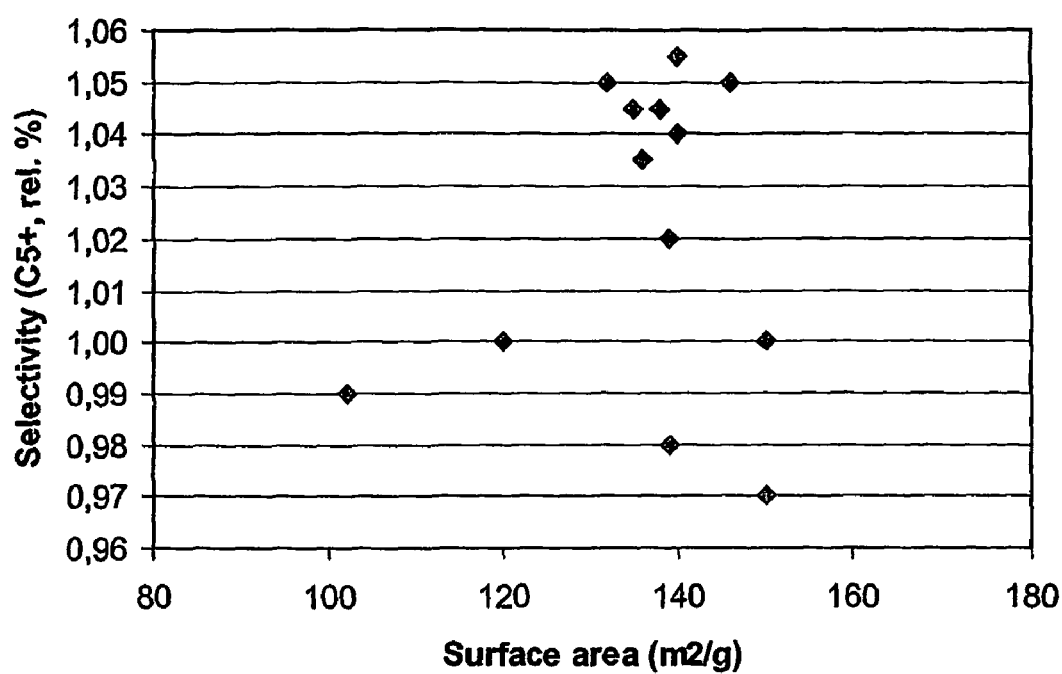
FIG. 3 illustrates there is no systematic relationship with the surface area.

However, what is highly surprising and significant is the increase in C5+ selectivity as one goes from the catalysts of type A, to C and flirter to the D-type catalysts. Even the lowest selectivity of the D catalysts is 3% higher than the highest selectivity of the A type. The data suggest a clear relationship between the selectivities and an increase in mean pore diameter, alternatively an increased pore volume. This is perhaps more clearly seen in FIGS. 1 and 2. FIG. 3 illustrates that there is no systematic relationship with the surface area for these catalysts.

In a separate series of experiments, catalysts made on two different supports were compared with different levels of the promoter, in this case rhenium or platinum. The data are summarised in Table 5. For un-promoted or rhenium promoted catalysts, it is again surprisingly found that the selectivity is systematically high for the catalysts prepared on the high pore volume, large pore diameter alumina support, C, and also for a variety of promoter (second metal) loadings. It can also be seen that the metal promoter has a significant effect on the catalyst activity for both supports. However, the platinum promoted catalysts do not show the expected result of changing the support material, in fact, platinum lowers the selectivity for both support C and Z to an equal and low level. This observation may be due to a special effect of platinum as this metal is known for easy dissociation of hydrogen molecules, which again may spill over and hydrogenate intermediate hydrocarbon species that are formed on cobalt.

| FIG. 5. Effect of alumina support material for different promoter (Rhenium) loadings. | | | | | |
|---|---|---|---|---|---|
| Promoter Content (wt %) | Surface area ($m^2/g$) | Mean pore diameter (Å) ($\times 10^{-10}$ m) | Pore volume ($cm^3/g$) | Relative activity | Relative $C_{5+}$ selectivity |
| Alumina C (Puralox SCCa) | 191 | 118 | 0.76 | | |
| 0 | | | | 0.99 | 1.09 |
| 0.1 Re | | | | 1.01 | 1.07 |
| 0.5 Re | | | | 1.27 | 1.08 |
| 1.0 Re | 139 | 113 | 0.48 | 1.45 | 1.08 |
| 0.02 Pt | | | | 1.37/1.44 | 1.02/1.00 |
| Alumina Z (Catapal B) | 205 | 98 | 0.67 | | |
| 0 | | | | 0.75 | 1.04 |
| 0.1 Re | | | | 0.94 | 1.04 |
| 0.5 Re | | | | 1.28 | 1.05 |
| 1.0 Re | | | | 1.13 | 1.04 |
| 0.02 Pt | | | | 1.55 | 1.00 |

The invention claimed is:

1. An impregnated and calcined Fischer-Tropsch catalyst for use in a Fischer-Tropsch synthesis reaction, the impregnated and calcined Fischer-Tropsch catalyst comprising cobalt supported on alumina, in which: the impregnated and calcined Fischer-Tropsch catalyst average particle size is in the range 20 to 100 μm; the specific surface area of the impregnated and calcined Fischer-Tropsch catalyst particles is greater than 120 $m^2/g$; the average pore size of the impregnated and calcined Fischer-Tropsch catalyst is at least 110 Å (11 nm); the pore volume of the impregnated and calcined Fischer-Tropsch catalyst is at least 0.45 $cm^3/g$; and the cobalt content of the impregnated and calcined Fischer-Tropsch catalyst is from 15 to 40% by weight.

2. A catalyst as claimed in claim 1, in which the specific surface area of the impregnated and calcined catalyst particles is in the range 120 to 220 $m^2/g$.

3. A catalyst as claimed in claim 1, in which the particle size range is 40 to 80 μm.

4. A catalyst as claimed in claim 1, in which the average pore size of the impregnated and calcined catalyst is at least 130 Å (13 nm).

5. A catalyst as claimed in claim 1, incorporating less than 3% by weight of a promoter.

6. A catalyst as claimed in claim 5, in which the promoter is rhenium or platinum.

7. A catalyst as claimed in claim 1, in which the support material is γ-alumina.

8. A catalyst as claimed in claim 7, in which the γ-alumina is stabilised with a stabilising agent.

9. A catalyst as claimed in claim 8, in which the γ-alumina is stabilised with lanthanum.

10. A catalyst as claimed in claim 1, in which the alumina support includes a binder.

11. A catalyst as claimed in claim 10, in which the binder represents less than 25% by weight of the catalyst.

12. A catalyst as claimed in claim 10, in which the binder is an alumina-containing binder material.

13. A catalyst as claimed in claim 1, in which the specific surface area of the prepared catalyst, comprising the cobalt in an active catalytic form on the support, is in the range 125 to 160 $m^2/g$.

14. A catalyst as claimed in claim 1, in which the cobalt content is from 15 to 25% by weight.

* * * * *

UNITED STATES PATENT AND TRADEMARK OFFICE
CERTIFICATE OF CORRECTION

| | | |
|---|---|---|
| PATENT NO. | : 8,324,128 B2 | Page 1 of 1 |
| APPLICATION NO. | : 10/535066 | |
| DATED | : December 4, 2012 | |
| INVENTOR(S) | : Rytter et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 918 days.

Signed and Sealed this
Seventeenth Day of June, 2014

Michelle K. Lee
*Deputy Director of the United States Patent and Trademark Office*